(12) United States Patent
Mundo (10) Patent No.: US 8,136,396 B2
(45) Date of Patent: Mar. 20, 2012

(54) APPARATUS FOR MEASURING AND/OR CONTROLLING LIQUID LEVELS

(75) Inventor: Oscar Horacio Mundo, Buenos Aires (AR)

(73) Assignee: Oscar Horacio Mundo, Buenos Aires (AR)

( * ) Notice: Subject to any disclaimer, the term of this patent is extended or adjusted under 35 U.S.C. 154(b) by 705 days.

(21) Appl. No.: 12/230,826

(22) Filed: Sep. 5, 2008

(65) Prior Publication Data

US 2009/0064777 A1  Mar. 12, 2009

(30) Foreign Application Priority Data

Sep. 6, 2007  (AR) ................................ P070103946

(51) Int. Cl.
*G01F 23/32* (2006.01)
(52) U.S. Cl. ......................................................... 73/317
(58) Field of Classification Search ...................... 73/317
See application file for complete search history.

(56) References Cited

U.S. PATENT DOCUMENTS

| | | | |
|---|---|---|---|
| 5,023,806 A * | 6/1991 | Patel ................................ 702/55 |
| 6,199,428 B1 * | 3/2001 | Estevez-Garcia et al. ...... 73/305 |
| 6,253,609 B1 | 7/2001 | Ross, Jr. et al. |
| 6,453,741 B1 | 9/2002 | Beck, II |
| 6,508,119 B2 | 1/2003 | Beck, II |
| 6,578,417 B1 * | 6/2003 | Eck .................................. 73/305 |
| 6,915,690 B2 | 7/2005 | Okada et al. |
| 6,993,968 B2 | 2/2006 | Kogure |
| 7,093,485 B2 * | 8/2006 | Newman et al. ................ 73/317 |
| 2004/0016296 A1 * | 1/2004 | Weisse ............................ 73/314 |
| 2005/0247124 A1 | 11/2005 | Fukuhara et al. |

FOREIGN PATENT DOCUMENTS

EP   1450142 A2   8/2004

* cited by examiner

*Primary Examiner* — Hezron E Williams
*Assistant Examiner* — Alex Devito
(74) *Attorney, Agent, or Firm* — Stein McEwen, LLP (57) ABSTRACT

An apparatus for measuring and/or controlling the level of a liquid, specially fuel, contained in a reservoir. The apparatus comprises means supporting a pivot member inside the reservoir, the pivot member comprising a stationary body fixed relatively to the supporting means and a rotary body connected to a lever, the free end of which carries a float. The rotary body includes a permanent magnet and the stationary member houses a magnetic sensor located within the magnetic field of the permanent magnet. Angular movement of the lever produces rotation of the magnet and is detected by the magnetic sensor which emits signals to a micro processor which, in turn, transmits such signals to external processing means. The processing means correlate such signals, which are proportional to variations in the liquid level, to the volume of liquid contained in the reservoir.

11 Claims, 6 Drawing Sheets

APPARATUS FOR MEASURING AND/OR CONTROLLING LIQUID LEVELS

FIELD OF THE INVENTION

This invention refers to an apparatus for measuring and/or controlling liquid levels. More particularly, this invention provides an apparatus for measuring and/or controlling liquid levels which is particularly suitable for use in underground fuel reservoirs in gasoline stations and which can be installed in existing operating reservoirs without requiring significant modifications.

BACKGROUND OF THE INVENTION

Gas stations normally have a number of underground fuel reservoirs which generally are installed about 3 feet below the ground level and include a threaded pipe at the top of the reservoir which permits access thereto for fuel level measurements.

Fuels have a high coefficient of volumetric expansion with temperature. This causes variations in the volume of the fuel contained therein as fuel temperature changes, even if there is no entry or exit of fluid in the reservoir. This variation could be easily mistaken as fuel input or discharge.

On the other hand, fuel leaks should be detected to protect the environment and personnel safety. International regulations (for instance, EPA Standard Evaluation) establish strict limits to minimum detectable leaks. These values could be as low as 0.38 liters per hour of leakage in a 30,000 liter reservoir.

Although fuel pumps can measure the quantity of fluid being dispended from a reservoir, pumps do not take into account the temperature of the fluid, nor the entry of fluid into the reservoir, nor possible leakage or pilfering that could take place. These requirements could be met only by high precision measuring systems enabling computerized processing of level and temperature readings carried out automatically and continuously.

OBJECTS OF THE INVENTION

An object of the invention is providing an apparatus for measuring and/or controlling the level of liquids contained in reservoirs or tanks which is highly precise, easy to install in existing reservoirs or tanks without requiring significant modifications, which consumes very little power, and which permits obtaining the detected information either through wired or wireless connections.

Another object of the invention is providing such apparatus having a digital electric output permitting computerized processing of the emitted signals.

A still further object of the invention is providing an apparatus of the above type which has few movable parts and a small volume enabling its installation in reduced spaces.

An additional object of the invention is providing an apparatus of the above type which in intrinsically safe for use in explosive environments and which resists corrosion and aggressive conditions of the environment.

BRIEF DISCUSSION OF THE PRIOR ART

The most primitive method for measuring fluid level employs a graduated rod having marks every 100, 200 or 500 liters which is introduced vertically in a fluid reservoir until it rests on the reservoir bottom. The rod is then extracted from the reservoir and the volume of liquid is estimated based on the height of the wet zone of the rod. This measuring method is very inexact and inconsistent in view of variations (ripples or waves) on the liquid surface.

Measuring methods using electric transductors are known in the art, the principal being those of capacitive or magneto-restrictive effect, and those employing pressure, ultrasound, radar or load cells. Of these, the only one that has been adapted to the requirements of a precise measuring method for underground fuel reservoirs in gas stations, is the level meter using the magneto-restrictive effect.

This system is very costly, requires considerable power to operate, and must be connected by means of special wiring to a remote control station having electric barriers of intrinsic safety in order that the whole system could operate in explosive environments.

Certain liquid level measuring apparatus employing magnetic means for detecting the position of a float are known. Amongst these, the following could be mentioned:

Published US Patent Application 2005/0247124 discloses a device for measuring the level of fuel contained in a vehicle tank. This device comprises a magnetic sensor of the linear type which detects changes in magnetic flow density, positioned between two polar pieces or stators, and through which magnetic flow generated by a rotatable magnet fixedly connected to a lever and a float circulates. This patent application describes a method of constructing this device for isolating the influence of external magnetic fields and contamination by magnetic particles suspended in the liquid, which are produced, inter alia by the vehicle fuel pump. The sensor is external to the magnet and positioned in a gap between the two polar pieces or stators.

U.S. Pat. No. 6,993,968 B2. This patent describes an arrangement similar to that of US 2005/0247124 and discloses means for preventing contamination of the magnetic device by magnetic particles suspended in the liquid. Such means comprise holes in a magnetic rotor arranged such that contaminating particles enter only through those holes and not between the rotor and the stator, since this would cause the system to lock and also alter the magnetic field.

European Patent EP 1450.142 A2 describes an arrangement very similar to that of US 2005/0247124.

U.S. Pat. No. 6,915,690 B2 also describes an arrangement very similar to that of US 2005/0247124.

U.S. Pat. No. 6,253,609 B1 discloses a level meter wherein a float and a lever drive a mechanical transmission which causes rotation of a magnet outside the reservoir. The magnet position is translated by undisclosed means to detect liquid level.

U.S. Pat. No. 6,453,741 B1 describes a level measuring apparatus comprising a magnetic coupling between a magnet immersed in the liquid and another magnet outside the liquid, the latter having an element converting rotation into electric signals (potentiometer, Hall-type sensor, etc.).

The above-mentioned patent documents coincide in using a magnetic field intensity sensor, such as a Hall-type sensor, and the magnitude they measure is proportional to the intensity of the magnetic field, which varies as the magnet rotates.

Besides, in the devices disclosed by the above-mentioned art, the sensor is positioned outside the magnet and the magnetic flux is guided by polar pieces (stators).

All the above arrangements depend on the intensity of the magnetic field and consequently are sensible to mechanical assembly, or aging of the magnet.

All of the above drawbacks make it impossible to use such arrangements for measuring the level of a liquid with high precision and through a long period of time.

U.S. Pat. No. 6,508,119 B2 describes an apparatus for measuring the level of fuel contained in a reservoir comprising a single magnetoresistive sensor positioned outside a magnet, close to the fuel reservoir wall and which changes its resistivity when the magnet connected to a lever and float moves. Since the single magnetoresistive sensor is positioned outside the magnet, has an electrical output which is not directly proportional to the rotation angle of the magnet. Besides, since a single sensor is used, compensation for temperature variations are very complicated. Consequently this device requires complex calibration for each case if precise measurements are to be made. On the other hand, this arrangement is not practical for existing underground reservoir installations because the external side of the reservoir wall is not accessible.

BRIEF SUMMARY OF THE INVENTION

In its broader aspect, the present invention provides an apparatus for measuring and/or controlling the level of a fluid, specially a fuel contained in a reservoir, comprising a support member positioned inside the reservoir and fixed with respect thereto, a lever having a first end connected to a float and a second end joined to a pivot member fixed to said support member such that the lever can move angularly with respect to said support member as the liquid level in the reservoir raises or lowers, said pivot member comprising a stationary body fixed to said support member and a rotatable body joined to the second end of said lever and which can rotate relatively to the stationary body around an axis; a permanent magnet mounted in said rotatable body, the magnetic field generated by said magnet being substantially perpendicular to said axis; a pair of magnetic sensors arranged in said stationary body and within the magnetic field generated by said magnet, said sensors reacting to said magnetic field and emitting signals depending on the angle of incidence of the magnetic field on the sensors, said signals being transmitted to processing means external to the reservoir, where readings could be made revealing the level of liquid in the reservoir and consequently the liquid volume of the liquid contained therein.

The level measuring apparatus of the invention utilizes two magnetoresistive sensors, spatially offset 90° one from the other and arranged coaxially with an annular magnet diametrically magnetized, the intensity of which is sufficient to saturate both magnetoresistive sensors. Thus, the electric output of the sensors depends on the angle of incidence of the magnetic field with respect to the sensors and is independent of the magnetization intensity of the magnet and its variations with time, and also insensitive to disturbances provoked by external magnetic fields.

In addition, since both sensors are integrated in the same encapsulation and have similar electric characteristics, the temperature effect is compensated because in order to calculate the angle of rotation of the magnet, the mathematical division between the two electric signals which are spatially generated at 90 degrees, is used, thus obtaining a result which is practically insensitive to changes of temperature in the sensors.

The invention will now be described with reference to the attached drawings which show, by way of non-limiting examples, preferred embodiments of the invention.

DETAILED DESCRIPTION OF PREFERRED EMBODIMENTS

Figure 1:
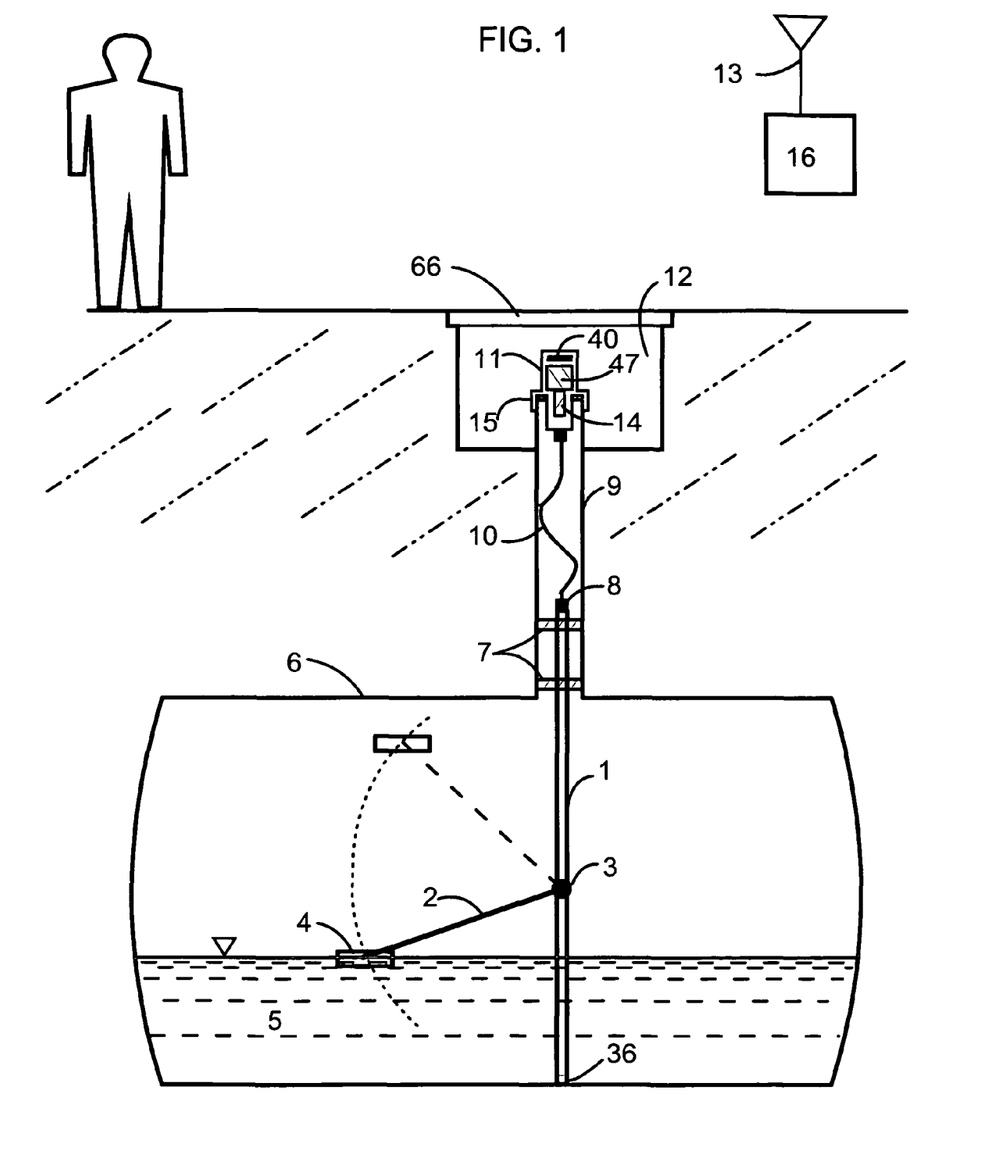
FIG. 1 shows an installation for controlling and/or measuring the level of fuels which employs the apparatus of the present invention.

FIG. 1 shows schematically an installation for the control and/or measurements of the level of a liquid, particularly fuel contained in an underground reservoir which is generally cylindrical in shape and is arranged with its longitudinal axis positioned substantially horizontal (in practice, with a slight inclination to facilitate settlement of contaminants). A conduit 9 is fixed to the top of reservoir 6 and extends up to a chamber 12 covered by a removable cover 66 which can be entered from the floor of, for instance, a gas station. All these elements are part of a conventional installation.

The level measuring apparatus of the invention comprises a support member comprising a vertical pipe 1, having a lower end resting on the wall of the underground reservoir 6, and an upper end which extends into conduit 9. The support member or pipe 1 has one or more spacers 7 (two are shown in the embodiment shown in FIG. 1) which permit maintaining the pipe 1 vertically and prevent movements of the pipe which would cause it to depart from the vertical position. Pipe 1 could be of round, square or rectangular cross section.

A lever 2, made of a light, rigid and strong material, for example aluminum or carbon fibers, is connected at one end to a pivot member 3 which permits the angular movement of the lever 2 with respect to a fixed point in pipe 1. The other, free end of lever 2 is pivotally connected to a float 4 which can move angularly relative to the free end of the lever 2. The combined weight of the lever 2 and the float 4 are selected such that the float 4 always floats, independently of the level and density of the liquid.

Spacers 7 comprise means (not shown) preventing rotation of pipe 1 about its longitudinal axis and maintain it in a position such that lever 2 and float 4 move in a vertical plane containing the horizontal axis of the reservoir 6.

Pipe 1 is hermetically sealed to prevent liquid from entering therein; its lower end is closed with a plug 36 which rests on the reservoir wall, while its upper end terminates in an electrical connector 8 which permits transmitting the signals generated by the level meter to a wireless transceptor 47 positioned in chamber 12 by means of a cable 10. The housing 11 of the wireless transceptor 47 is fluid-tight and hermetically sealed by a cap 15 which covers the upper end of conduit 9 and, therefore, isolates the reservoir from the outside.

Within the transceiver housing 11, there is a battery 14 of the intrinsic safety type which supplies the power required for the operation of both the transceiver 47 and the measuring apparatus. Inside the housing 11 of transceptor 47 there is a suitable antenna 40 which enables the transceptor to communicate with a remote signal processing equipment 16 which has an outer antenna 13 receiving the signals emitted by the transceiver. The remote processing equipment equates 16 level readings to volume based on a calibration chart for the particular reservoir controlled by the apparatus of the invention.

It will be understood that upon varying the level of the liquid contained in the reservoir 6, the float 4 will move up and down and cause rotation of lever 2 and, in turn, rotation in the pivot member 3.

Figure 2:
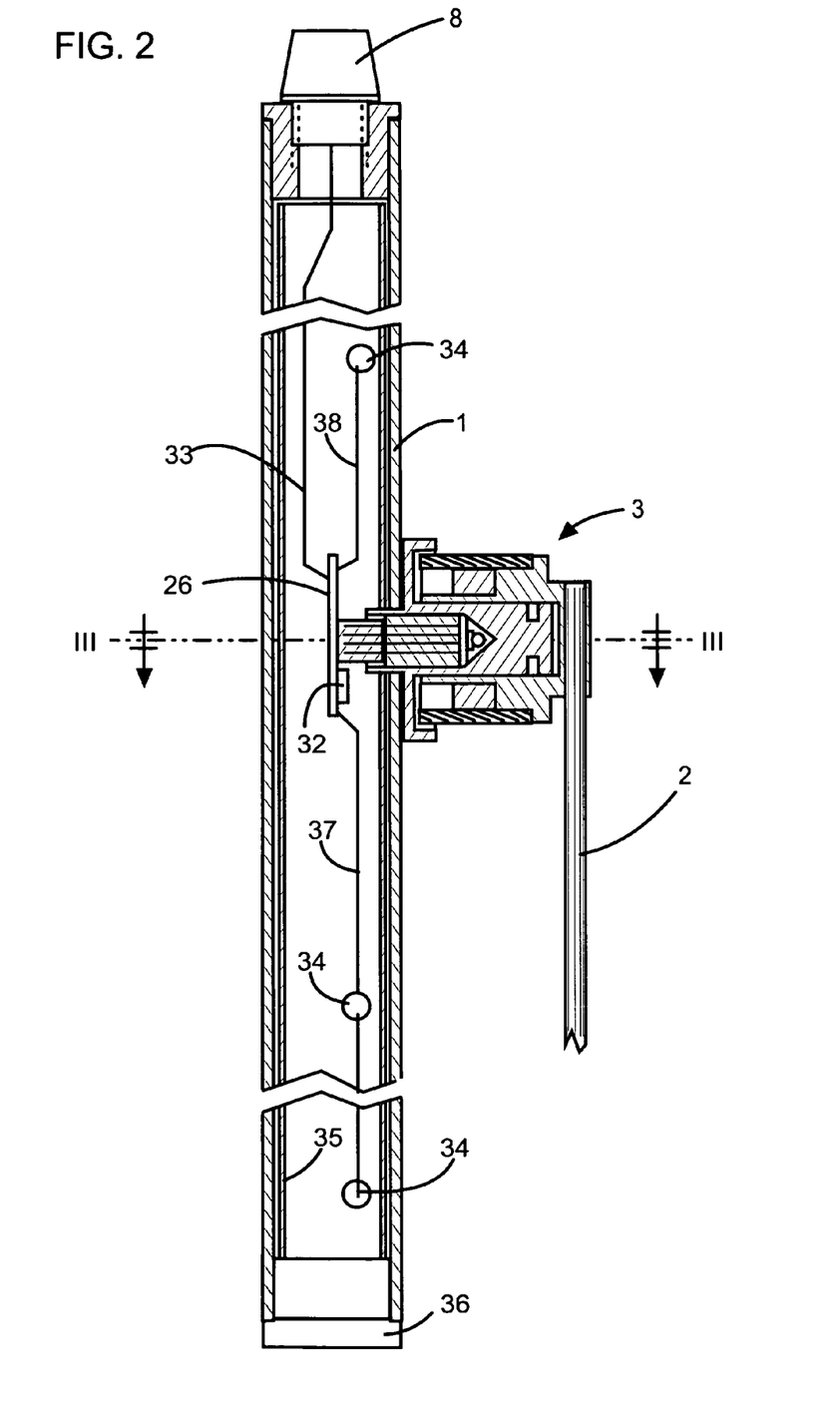
FIG. 2 is a general, enlarged, partly sectional view showing in detail the metering assembly.
Figure 3:
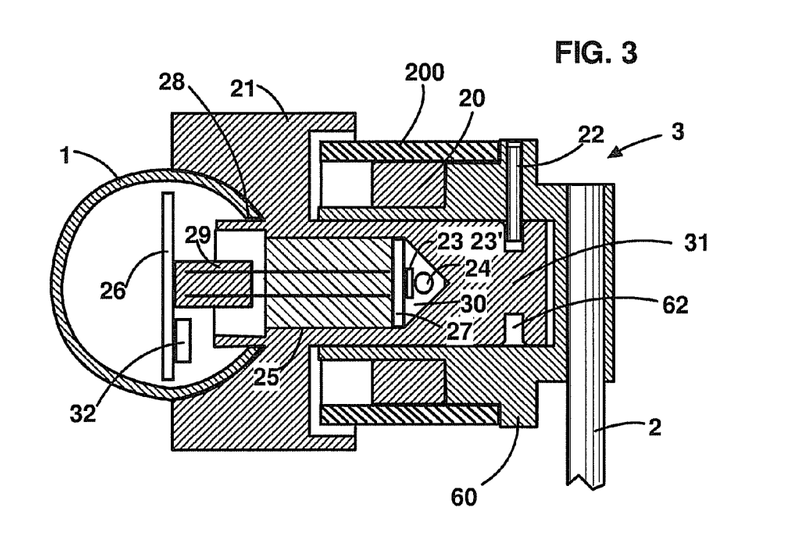
FIG. 3 is a cross section of the metering apparatus along line III-III of FIG. 2 which shows in more detail the pivot member which connects the lever connected to the float with a tube housing a processor and its wiring. For clarity purposes, the lever is shown rotated 90°.

As can be seen in FIGS. 2 and 3 which is a cross section of the metering apparatus along line III-III of FIG. 2, pivot member 3 comprises a stationary body 21 attached to pipe 1, and a stub shaft 31 formed by a cylindrical projection extending from the stationary body 21 which rotatably supports a rotatable body 60 attached to lever 2. Shaft 31 has, adjacent its free end, a groove 62 in which a key 22 is located to prevent disengagement of the rotatable body 60 from shaft 31.

Rotatable body 60 has stepped cylindrical surfaces, coaxial with shaft 31. A ring-shaped permanent magnet 20 is fixedly mounted at the end of rotatable body 60 proximal to stationary body 21. Magnet 20 is surrounded by an annular yoke 200 made of magnetic material with a high magnetic saturation which concentrates the magnetic field generated by the magnet 20 and acts as a shield to prevent dispersion of the magnetic field outside the pivot member 3. Magnet 20 is diametrically magnetized and, preferably, is made of a material having high magnetization strength and low demagnetizion with time, such as SmCo (samarium-cobalt).

Stationary body 21 has a cylindrical cavity 30 coaxial with shaft 31 which communicates with the inside of pipe 1 through a hole 28 in the pipe, but such cavity 30 is hermetically isolated from the outside of pipe 1.

Cavity 30 houses two magnetoresistive sensors 23 and 23' positioned concentrically with magnet 20 and within its magnetic field. Sensors 23, 23' are welded to a plate 27 which is firmly attached to the stationary body 21 and fixed in position with an encapsulating adhesive 25. Plate 27 is coupled by means of a connector 29 to a main board 26 arranged inside pipe 1. Sensors 23, 23' have each an electrical output which can be read through connector 29 by a processor 32 positioned on board 26. A temperature sensor 24 is also welded to plate 27 for detecting the temperature of sensors 23, 23' and thus compensate thermal variations of the electric signal emitted by each sensor 23, 23'. The temperature sensor 24 is also connected to processor 32 via connector 29.

The magnetic field generated by the permanent magnet is very intense and uniform in the proximity of sensors 23 and 23' such that it exceeds the magnetic saturation value of sensors 23, 23' and renders insignificant the possible interference of disturbing magnetic fields foreign to the level meter.

Sensors 23, 23' are of the magnetoresistive type. Suitable sensors are, for instance, those manufactured by Philips under designation KM243T, in which two sensors are located in a single capsule and are spatially offset 90 degrees one with respect to the other. However, it would be possible to use two independent sensors, offset an angle different from 90° with similar results. The magnetoresistive effect of sensors 23, 23' when subject to an intense magnetic field 201 (see FIG. 5) which exceeds their saturation value results in an electric output which is proportional to the angle of incidence of the magnetic field 201 on each sensor and not depending on the intensity of magnetic field 201. Since sensors 23 and 23' are offset 90 degrees, one relative to the other, the respective electric signals will be proportional to components X and Y of the magnetic field, which correspond with the rotation angle of magnet 20.

Figures 4, 5:
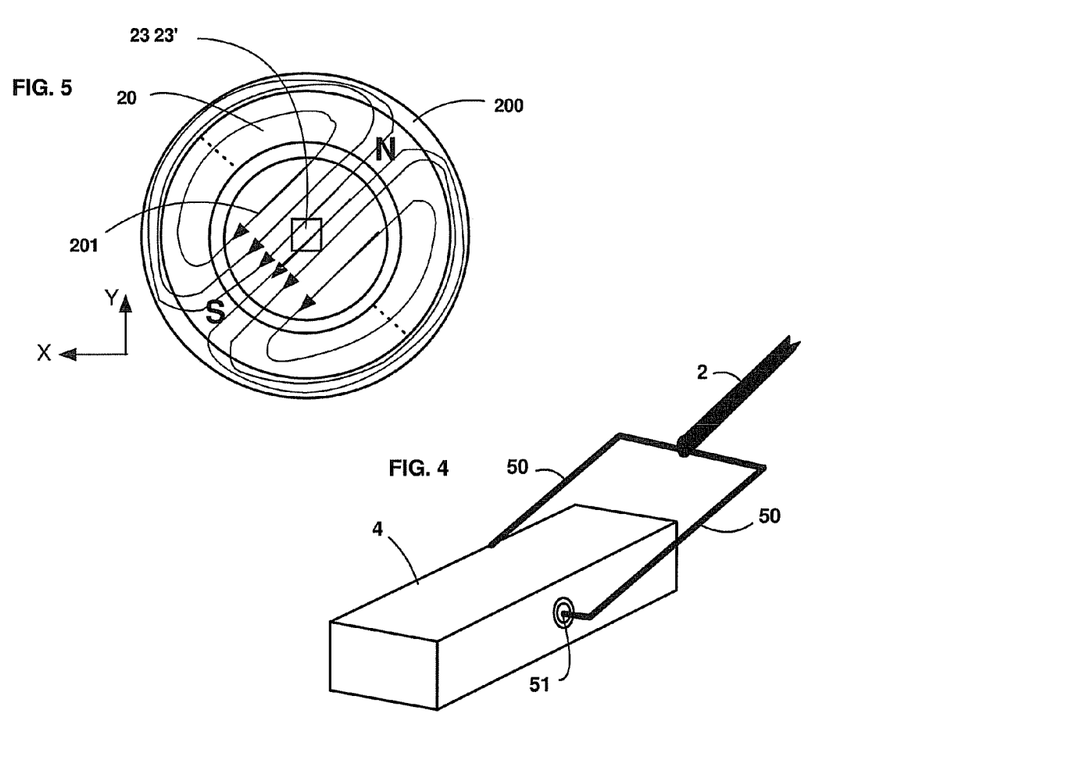
FIG. 4 is a perspective view of the float and the manner in which it is pivotally connected to the lever.
FIG. 5 represents, schematically, the interaction between the magnetic field generated by the magnet and the sensors.

These two electric signals emitted by sensors 23, 23' permit calculating with great precision the angle between the lever and the support member, and the liquid level can be readily calculated as a function of such angle and the length of lever 2.

Knowing the rotation angle of lever 2 and based on the length of lever 2, the processor can calculate the level of the liquid 5 contained in reservoir 6. Other additional calculations permit taking into consideration variations of the flotation point of the float 4 depending on whether or not lever 2 is immersed in the liquid.

FIG. 2 is an enlarged and partial section of pipe 1 and pivot member 3, in which the wiring 33 inside the pipe 1 can be observed. Said wiring transmit signals calculated by the processor 32 to connector 8 and supplies power from battery 14 to the level measuring apparatus of the invention.

Inside pipe 1 there is an inner tube 35 which serves as a support for board 26 and temperature sensors 34, which are spaced along pipe 1 and connected by means of conductors 37 and 38 to processor 32. Tube 35 permits and facilitates assembly of all electrical components prior to their introduction into pipe 1 during construction of the level measuring apparatus.

Temperature sensors 34 emit signals read by the processor 32 and permit knowing the temperature of liquid 5 at different levels thereof, and to effect corrections taking into consideration the volume expansion or contraction of the reservoir with temperature variations.

FIG. 4 shows schematically the manner in which the float 4 is connected to the free end of lever 2. As it can be seen, two arms 50, fixed to the free end of lever 2 are connected to respective side pivots 51 provided in the float 4 which, in the embodiment shown, is prismatic in shape. It is desirable to have a large floating surface to enhance resolution of the measurement and decrease the mechanical hysteresis of the lever movement.

The proposed design permits that the float always exposes a constant and maximum flotation surface, independently of liquid level.

The width of the float is limited by the diameter of conduit 9 but its length could be quite large, because, it could rotate to a vertical position and pass through conduit 9.

Alternatively, the desired results in respect to flotation area and its constancy could be attained employing a spherical float fixed to the free end of lever 2, but in that case, the diameter of the float would be limited by the inside diameter of the conduit 9 since it has to be introduced therethrough. Besides, a spherical float is more costly than a prismatic float and the latter permits modifying its width to facilitate insertion through conduit 9.

FIG. 5 is a cross section of pivot member 3 which shows schematically the interaction between the magnetic field 201 generated by the permanent magnet 20 and sensors 23, 23'.

Figure 6:
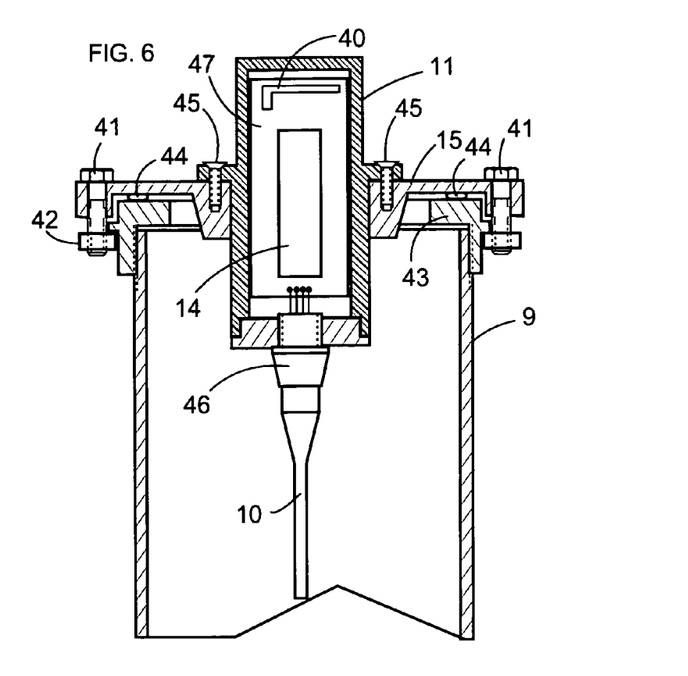
FIG. 6 is a longitudinal section of the cover which supports the transceptor housing.

FIG. 6 shows in greater detail cap 15 of conduit 9 which supports the housing 11 of transceiver 47. The cap 15 is attached by screws 41 and nuts 42 to lugs radially projecting from an intermediate cover 43 having a central opening which is screwed to the top end of conduit 9. The transceiver housing 11 in turn, is attached by screws 45 to cap 15. An O-ring 44 between cap 15 and intermediate cover 43 ensures hermeticity of the assembly.

Figure 6A:
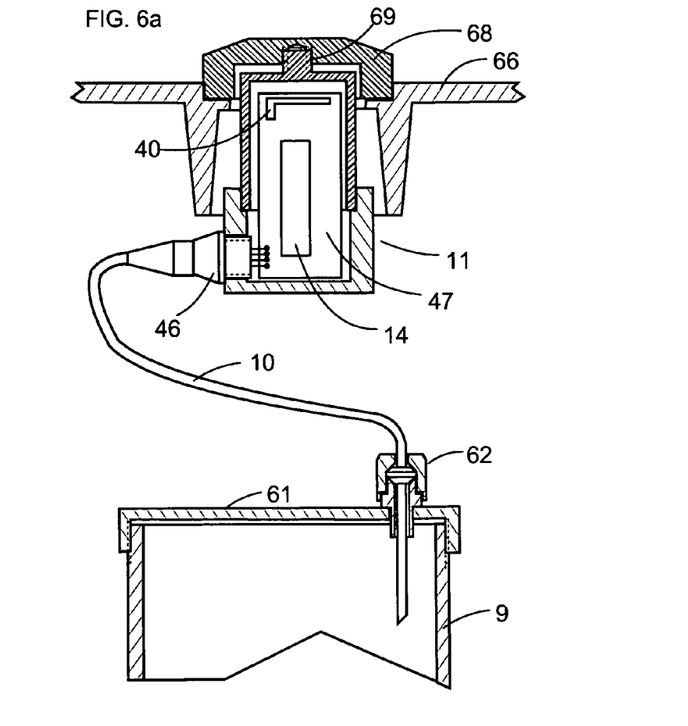
FIG. 6a shows an alternative embodiment where the cover is separated from the transceptor housing.

FIG. 6a shows an embodiment in which the transceiver housing 11 is separated from the conduit 9. In this alternative embodiment, conduit 9 is closed by a cap 61 which is screwed to the top end of conduit 9 and the transceiver housing is attached to the cover 66 of chamber 12 by means of a threaded projection 69 which is screwed to a threaded cavity in a retainer member 68. The transceiver 47 is connected to connector 8 by means of a cable 10 which passes through an opening in cap 61 which is provided with a stress-relieving member 62 to ensure fluid tightness of conduit 9.

Construction of the pivot member 3 shown in FIG. 3 also admits variations. Thus in FIG. 7, a stationary body 71 is fixedly joined to pipe 1 and a shaft 72 having an axial cavity 75 containing the magnetic sensors 23, 23' is fixed to the stationary body 71 by screws 76. An O-ring 70 provides an hermetic seal. A threaded fastener 73 permits maintaining connection between the rotatable body 74 and shaft 72.

Figures 7, 8, 9:
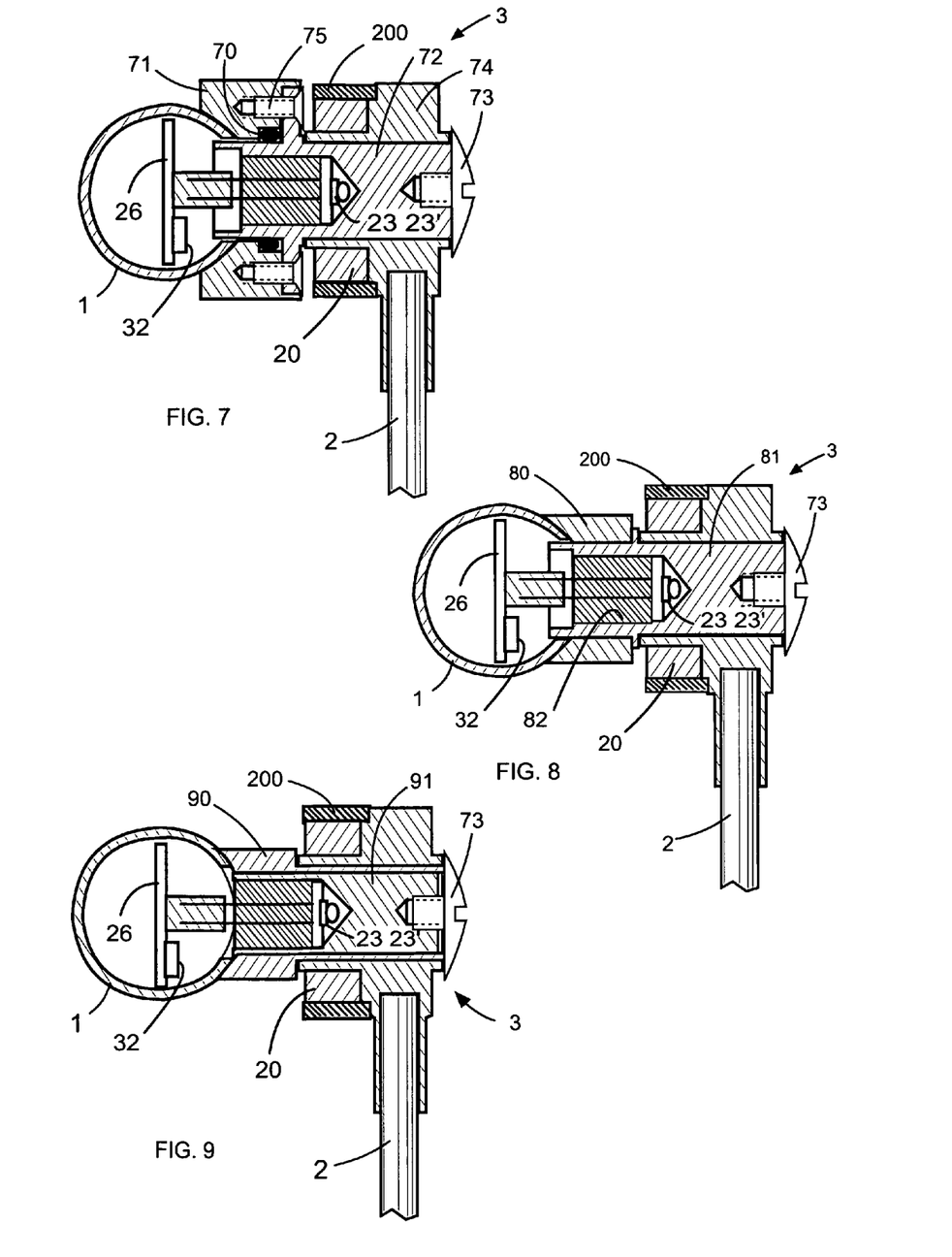
FIGS. 7-11 show alternative embodiments of the invention.

FIG. 8 shows another embodiment similar to that of FIG. 7 wherein a stationary body 80 is joined to pipe 1, and a shaft 81, having an axial cavity 82 containing the magnetic sensors 23, 23', is attached to stationary body 80 with a suitable adhesive.

FIG. 9 shows still another embodiment of the pivot member 3 in which a stationary body 90 is joined to pipe 1 and serves as the shaft for the rotatable body to which lever 2 is attached. The shaft is tubular and a cylindrical member 91, having an axial cavity housing sensors 23, 23' is inserted into the shaft bore and held in place by fastener 73.

Figure 10:
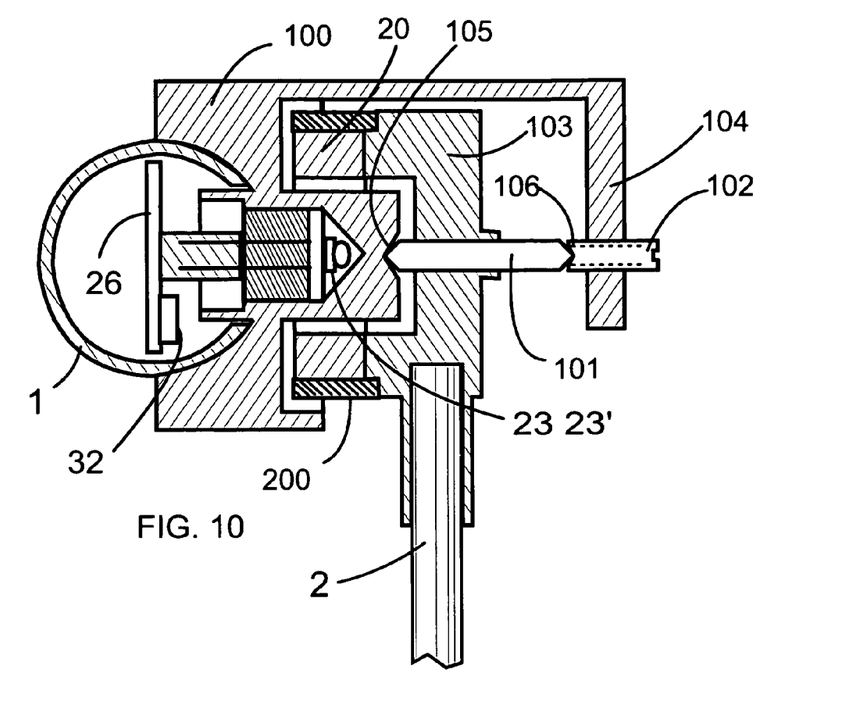

FIG. 10 shows yet another embodiment of pivot member 3 in which a stationary body 100 having an axial cavity housing sensors 23, 23' is joined to pipe 1 and has an extension 104 in which an adjusting screw 102 is threaded. A rotatable body 103 which transmits the movement of lever 2 has a shaft 101 fixed thereto. The ends of shaft 101 are supported by respective pivots 105, 106 provided in the stationary body 100 and in screw 102, respectively.

Figure 11:
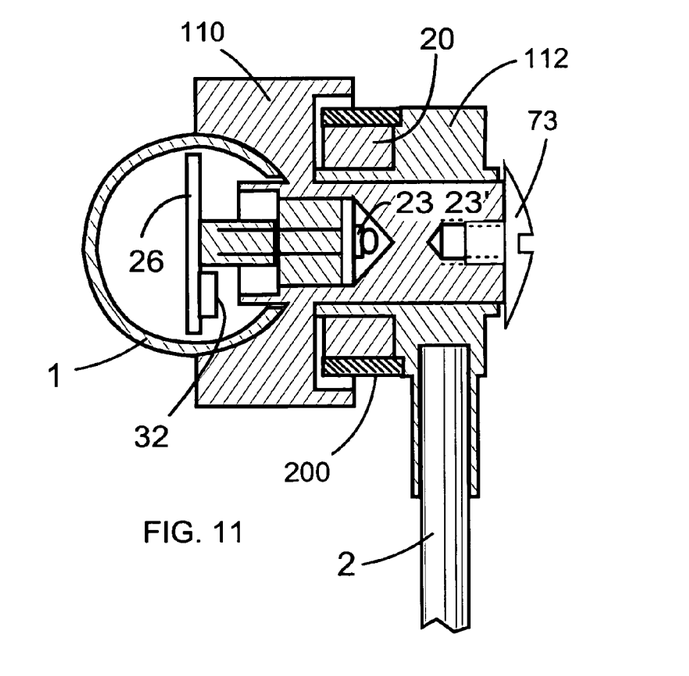

FIG. 11 shows an additional embodiment of pivot member 3 which is similar to that of FIG. 7. The stationary body 110 is attached to pipe 1 and has an integral projection defining a shaft on which a rotatable body 112 carrying the annular magnet 20 and yoke 200 is mounted. A fastener 73 prevents disengagement of the stationary and rotatable bodies.

It will be understood that other constructive variations are possible, which those skilled in the art could easily envision, provided such variations are within the spirit and scope of the invention, as defined in the attached claims.

The permanent magnet does not have to be annular. It would suffice that it creates a magnetic field perpendicular to the axis of rotation, and the magnetic sensors could react to perpendicular components of such magnetic field.

Although in the embodiment shown and described the signals emitted by the magnetic sensors are transmitted wirelessly to external processing means, such transmission could be wired. Wireless transmissions facilitates installation of the level meter of the invention in existing fuel reservoirs.

Occasionally, outside water could leak into fuel reservoirs. This water, being denser than fuel would tend to concentrate in the lower part of the reservoir. It is important to detect the existence of water and prevent it from being accidentally supplied to a vehicle together with the fuel since this could provoke serious damage to the engine. To prevent this situation, a level meter similar to that described above, but much smaller, could be installed in the lower part of pipe 1. The float of such additional level meter would be arranged in the interface between water and fuel.

It will be understood that the present invention, although described and shown in respect of the measurement and/or control of fuel level in underground reservoirs, could be also employed for the measurement and/or control of other liquids in other environments, either above or below the ground level.

The invention claimed is:

1. An apparatus for measuring and/or controlling the level of fuel stored in and eventually dispensed from a reservoir located at a gas station, said apparatus comprising a vertical support pipe positioned inside the reservoir and hermetically isolated from the fuel contained therein; a lever having a first end connected to a float and a second end joined to a pivot member fixed to said support pipe such that the lever can move angularly with respect to said support pipe as the fuel level in the reservoir raises or lowers, said pivot member comprising a stationary body fixed to an intermediate portion of said support pipe and a rotatable body joined to the second end of said lever and which can rotate relative to the stationary body around an axis; a pair of magnetoresistive sensors offset each from the other arranged in a cavity of said stationary body, a permanent magnet mounted in said rotatable body, said permanent magnet being substantially ring shaped and coaxial with said axis, said permanent magnet being diametrically magnetized; an annular yoke of magnetic material mounted in said rotatable body surrounding said permanent magnet and coaxial therewith, said yoke offering to the magnetic field a path to maximize the intensity of the magnetic field acting on the sensors and preventing dispersion of magnetic field outside said magnet, the magnetic field generated by said magnet being substantially perpendicular to said axis and of an intensity high enough to saturate the internal magnetization of said pair of magnetic sensors, independently of the position of said permanent magnet, said magnetic sensors being capable of reacting in response to changes in the angle of incidence of said magnetic field traversing said sensors and unable to react in response of changes in the intensity of said magnetic field; the respective outputs of said sensors, which depend on the angle of incidence of the magnetic field relative thereto, are transmitted to processing means external to the reservoir where readings could be made revealing the fuel level and, consequently, the volume of the fuel contained in the reservoir.

2. An apparatus as claimed in claim 1, wherein said magnetic sensors are offset 90° each from the other.

3. An apparatus as claimed in claim 1, wherein said stationary body comprises a cylindrical projection defining a shaft around which the rotatable body can move angularly, and a cavity in said cylindrical projection housing said sensors, which are positioned concentrically with said annular permanent magnet.

4. An apparatus as claimed in claim 1, wherein said support pipe contains a processor connected to said magnetic sensors and to a transceiver contained in a fluid-tight housing, said transceiver being capable of transmitting wirelessly signals emitted by said processor to external processing means; said processing means correlating level readings to volume contents by means of a calibration chart for the reservoir being controlled.

5. An apparatus as claimed in claim 4, wherein the upper end of the support pipe is hermetically closed by connector and partially extends into a conduit projecting from the reservoir and communicating therewith, said conduit having a free end closed hermetically with a cap, the lower end of said support pipe being closed with a plug and resting against the bottom wall of the reservoir; said connector being electrically connected to said processor and to said transceiver.

6. An apparatus as claimed in claim 5, wherein said cap closing said conduit supports a housing containing the transceiver and a battery powering the transceiver, said transceiver having an antenna for transmitting signals emitted by the processor to said external processing means.

7. An apparatus as claimed in claim 4, comprising a temperature sensor positioned in said cavity of the stationary body and adjacent said magnetic sensors, said temperature sensor being capable of measuring the temperature of the magnetic sensors, and also the temperature of the fuel at the level of said temperature sensor, said temperature sensor being connected to said processor to compensate variations in the electric signal emitted by each magnetic sensor depending on its temperature.

8. An apparatus as claimed in claim 7, wherein the magnetic sensors and the temperature sensor are mounted on a plate positioned within the cavity in said stationary body and said processor is mounted on a board positioned within said support pipe.

9. An apparatus as claimed in claim 7, wherein additional temperature sensors are arranged at different levels of said support pipe and connected to said processor to correct the processor readings based on the temperature at different levels of the fuel contained in the reservoir.

10. An apparatus as claimed in claim 1, wherein said support pipe contains a processor connected to said magnetic sensors and to a transceiver contained in a fluid-tight housing, said transceiver being capable of transmitting wirelessly signals emitted by said processor to external processing means; said processing means correlating level readings to volume contents by means of a calibration chart for the reservoir being controlled; a temperature sensor positioned in said cavity of said stationary body, adjacent said magnetic sensors, said temperature sensor being capable of measuring the temperature of the magnetic sensors, and also the temperature of the fuel at the level of said temperature sensor, said temperature sensor being connected to said processor to compensate variations in the electric signal emitted by each magnetic sensor depending on its temperature; and additional temperature sensors arranged at different levels of said support pipe and connected to said processor to correct the processor readings based on the temperature at different levels of the fuel contained in the reservoir.

11. An apparatus as claimed in claim 1, wherein the float is pivotally connected to the first end of the lever such that the float may move relatively to said first end.

\* \* \* \* \*